Aug. 22, 1950     C. S. BRANDVOLD     2,519,429
BUMPER FOR AUTOMOTIVE VEHICLES
Filed April 22, 1947     2 Sheets-Sheet 1
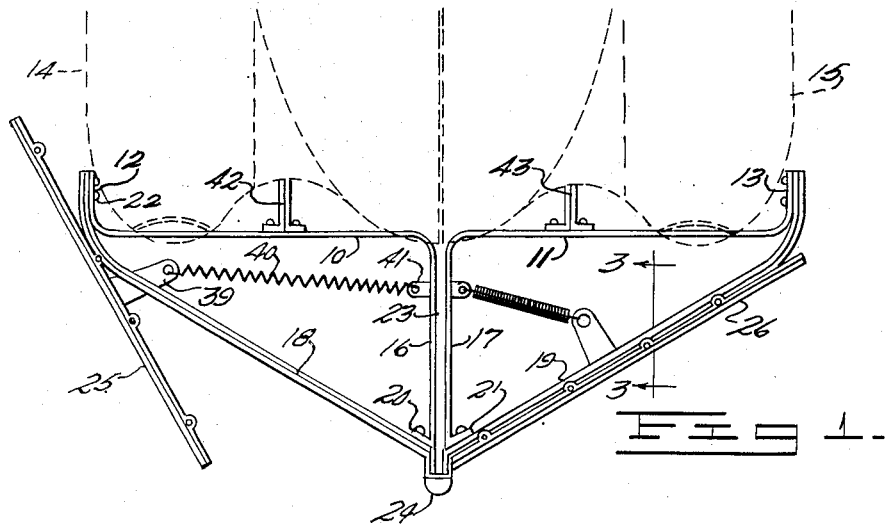
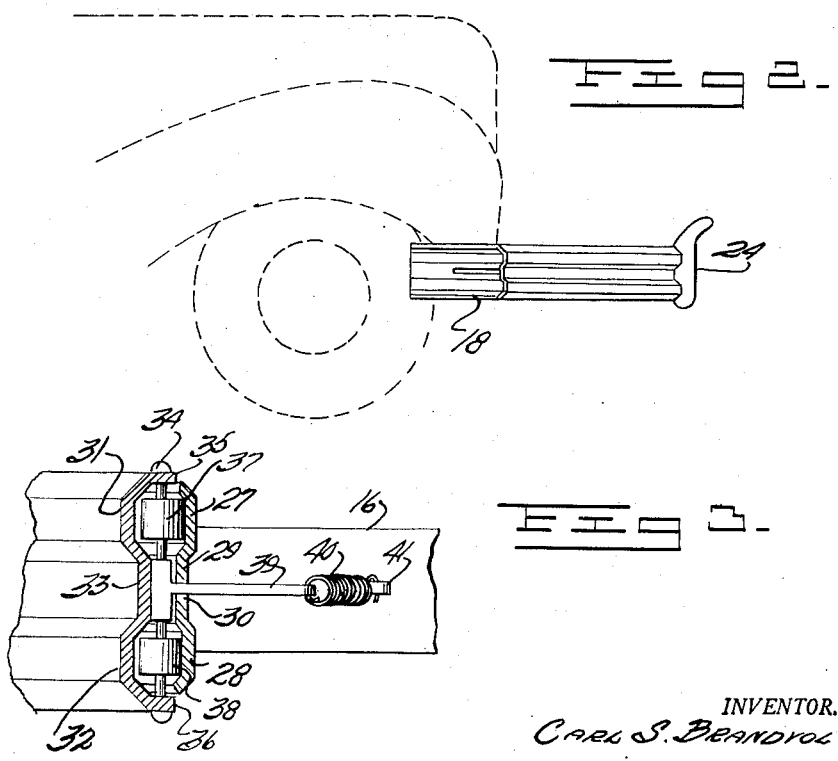
INVENTOR.
Carl S. Brandvold
BY
McMorrow, Berman & Davidson
ATTORNEYS Aug. 22, 1950
C. S. BRANDVOLD
2,519,429
BUMPER FOR AUTOMOTIVE VEHICLES
Filed April 22, 1947
2 Sheets-Sheet 2
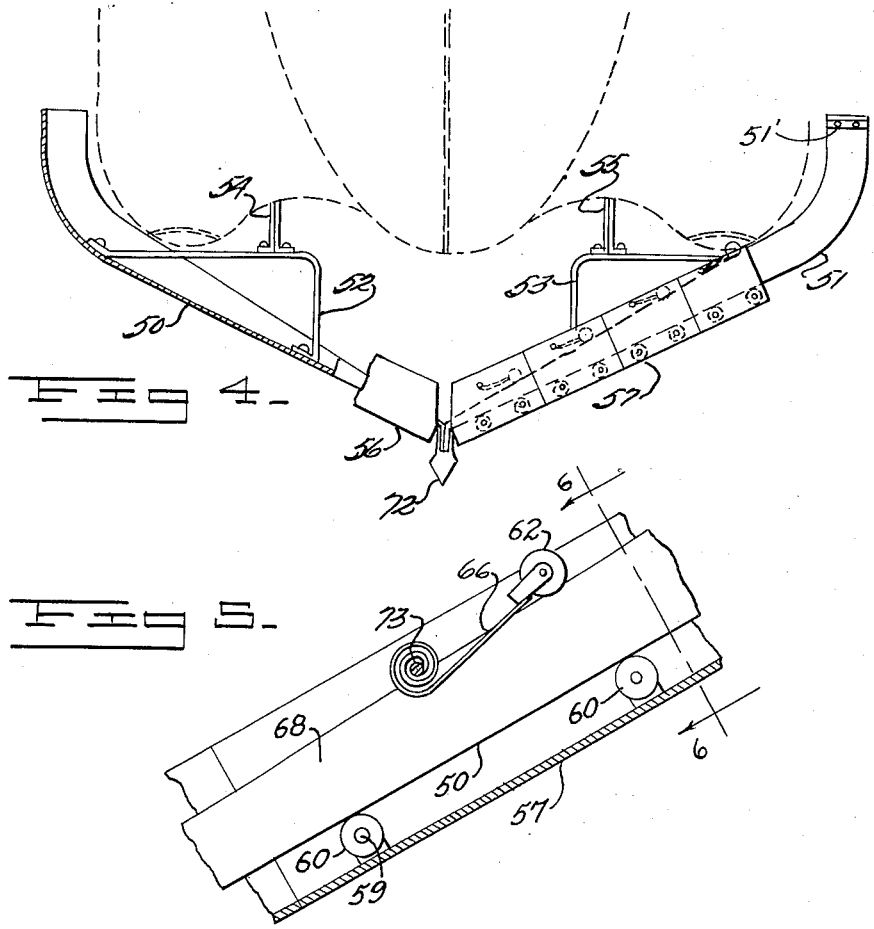
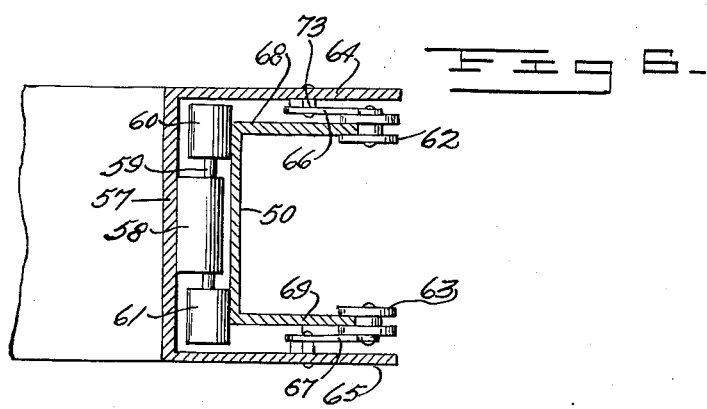
INVENTOR.
Carl S. Brandvold
BY
McMorrow, Berman & Davidson
ATTORNEYS Patented Aug. 22, 1950

2,519,429

UNITED STATES PATENT OFFICE 2,519,429

BUMPER FOR AUTOMOTIVE VEHICLES

Carl S. Brandvold, Cut Bank, Mont.

Application April 22, 1947, Serial No. 743,059

1 Claim. (Cl. 293—89)

This invention relates to improvements in bumpers or guards for automotive vehicles and more particularly to an improved front end bumper having fixed and movable portions provided with antifriction bearing means between them to direct a vehicle away from an obstruction encountered thereby without material damage to the vehicle or the bumper mechanism.

It is among the objects of the present invention to provide an improved front end bumper for an automotive vehicle which has greatly increased strength by reason of the trussed formation thereof, which extends sufficiently ahead of the vehicle to provide an adequate cushioning effect in the event of collision with an object or obstacle, which has its side members disposed at an angle to the longitudinal center line of the vehicle such as to impart only a glancing or sliding blow in case of collision with an object or obstacle, and which is provided with movable side members associated with fixed side members by means of antifriction bearings to increase the ease of movement of said movable side members from their normal position by contact or collision of the vehicle with an object or obstacle.

Other objects and advantages will become apparent from a consideration of the following description in conjunction with the accompanying drawing wherein:

Fig. 1 is a top plan view of an improved bumper a fragmentary portion of the front end of a vehicle being shown in broken lines to illustrate the application of the improved bumper thereto;

Fig. 2, a side elevational view of the improved bumper, a fragmentary portion of the front end of a vehicle being shown in broken lines to illustrate the application of the improved bumper to a vehicle;

Fig. 3, a transverse sectional view on a somewhat enlarged scale on the line 3—3 of Fig. 1;

Fig. 4, a top plan view of a somewhat modified form of vehicle bumper operating on the same principle as the bumper illustrated in Figs. 1, 2 and 3, a portion of the bumper illustrated in Fig. 4 being broken away and shown in section to better illustrate the construction thereof;

Fig. 5, a longitudinal sectional view on a somewhat enlarged scale of a fragmentary portion of the bumper illustrated in Fig. 4; and, Fig. 6, a transverse sectional view on the line 6—6 of Fig. 5.

With continued reference to the drawings and particularly to Figs. 1, 2 and 3, the improved bumper comprises a pair of supports or frame members 10 and 11, each having an intermediate portion extending transversely across one-half of the front end of the vehicle, and end portions 12 and 13 bent substantially at right angles to the corresponding intermediate portions and directed rearwardly along the outer sides of the vehicle front fenders 14 and 15, when the bumper is in the operative position on the vehicle illustrated in Fig. 1, and opposite end portions 16 and 17 also bent at right angles to the corresponding intermediate portions and extending directly ahead of the vehicle, and fixed bumper guard members 18 and 19 extending from the outer ends of the end portions 16 and 17 to the corresponding end portions 12 and 13. The end portions 16 and 17 are provided with outwardly turned flange portions 20 and 21 to which the corresponding ends of the members 18 and 19 are secured by suitable means such as rivets and at their outer ends the members 18 and 19 are bent on a curvature of large radius until the outer end portions are substantially parallel to the end portions 12 and 13 of the members 10 and 11 to which they are secured by suitable means such as the rivets 22.

A spacer member 23, preferably in the form of an elongated metal bar of rectangular cross section is disposed between the end portions 16 and 17 of the members 10 and 11 and extends somewhat beyond these end portions to receive an ornamental peak or cap 24 which constitutes the apex of the triangle formed by the members 10 and 11 and the corresponding guard members 18 and 19.

The triangular shaped bumper is formed of two component triangles giving to the entire bumper a trussed triangular construction of maximum strength and the portions 16 and 17 of the members 10 and 11 have a length sufficient to position the inner ends of the fixed guard members 18 and 19 a sufficient distance ahead of the vehicle to provide a bumper of adequate cushioning effect. The angle which the fixed guard members 18 and 19 make with the intermediate portions of the members 10 and 11 is also sufficient to tend to deliver only a glancing or sliding blow to an obstacle encountered by the vehicle and to sheer the vehicle away from such an obstacle.

A pair of movable guard members 25 and 26 are operatively associated with the fixed guard members 18 and 19 respectively by suitable antifriction means and resilient means operative to return the movable guard members from a displaced position to their normal position relative to the fixed guard members.

As illustrated in Fig. 3, the fixed guard members have a cross sectional shape providing two shallow troughs 27 and 28 substantially parallel to each other and vertically spaced apart by an intermediate flat ridge 29 provided with an elongated slot 30. The movable guard members are also formed cross sectionally to provide two vertically spaced shallow troughs 31 and 32, oppositely disposed to the troughs 27 and 28 of the fixed guard member and separated by a ridge or indentation 33. A plurality of axle pins 34 have their ends secured in edge flanges 35 and 36 of the movable guard member and each pin carries two rollers 37 and 38 disposed one in each trough portion 31 and 32 and riding in the trough portion 27 and 28 respectively of the fixed guard members.

Similar rollers are spaced at desired intervals along each movable guard member and permit the movable guard members to slide outwardly easily on the corresponding fixed guard members.

Each movable guard member has an arm 39 positioned substantially at right angles thereto and extending inwardly through the elongated slot in the corresponding fixed guard member and provided at its inner end with an aperture in which is secured one end of a coiled tension spring 40 the opposite end of which is secured in an apertured lug 41 extending outwardly from the inner end portion of the corresponding support or frame member. When a movable guard member is displaced from its normal position, as is the outer guard member 25 in Fig. 1, the corresponding spring 40 will be stretched and upon release of the force displacing the outer guard member will return the outer guard member to its normal position in which it lies along the outer face of the corresponding fixed guard member, as does the movable guard member 26 of Fig. 1. The return movement of the movable guard member to its normal position is limited by contact of the inner end of the movable guard member with the corresponding side of the peak or cap member 24.

The bumper is supported on the frame of the automobile by suitable brackets 42 and 43 which are secured to the intermediate portions of the corresponding frame or support members 10 and 11 and extend rearwardly from these frame members to suitable connections with the front ends of the side members of the vehicle frame.

In the modified arrangement of Figures 4, 5, and 6 the principles of operation are substantially the same as those described above in connection with Figures 1, 2 and 3, but the contruction of the bumper is somewhat different. In the modified arrangements the fixed guard members 50 and 51 are formed of flat metal and have a channel cross sectional shape the flanges of the channel increasing uniformly in width from the inner toward the outer ends of these members, as is clearly shown in Figure 4. Respective support members 52 and 53, having end portions disposed substantially at right angles to each other, are secured at their ends to the web portions of the members 50 and 51 and are attached by brackets 54 and 55 to the front ends of the vehicle side frame members, the brackets being attached to the end portions of the members 52 and 53 which are positioned substantially transverse to the front end of the vehicle and near the bends between these end portions and the corresponding end portions which extend directly forwardly of the vehicle to respective connections with the inner end portions of the members 50 and 51.

Movable guard members 56 and 57 are mounted on the fixed guard members 50 and 51 respectively. Each of these members is formed of a plurality of separate sections and a pair of elongated apertured lugs 58 extend inwardly from the web of each movable guard member section and a respective pin 59 is secured, intermediate its length, in each lug and carries upon its opposite ends rollers 60 and 61 which ride upon the outer surface of the web of the corresponding fixed guard member 50 and 51. These rollers permit the movable guard member sections to slide lengthwise along the corresponding fixed guard members with a minimum of friction, and to pass around the curved outer end portions of these fixed members until the outer section contacts the fixed abutment 51'. A plurality of spool shaped upper rollers 62 and spool shaped lower rollers 63 are secured to the upper flange 64 and lower flange 65 of each movable guard member by means of coiled tension springs 66 and 67. The upper spool shaped rollers receive in the annular grooves thereof the inner tapered edge of the upper flange 68 of the corresponding fixed guard member and the lower spool shaped rollers 63 correspondingly receive the tapered inner edge of the lower flange 69 of the corresponding fixed guard member. Coiled torsion springs 66 and 67 resiliently force the upper roller 62 and the lower roller 63 against the tapered inner edges of the fixed guard member flanges and, by running down the enclined flanges 68 and 69, resiliently urge the movable guard members to their normal position in which their inner ends are against the corresponding sides of the cap or peak member 72, the springs being secured to the corresponding upper and lower flanges of the movable guard member by suitable pins 73. With this construction the movable guard members are easily moved outwardly along the corresponding fixed guard members under the force of the impact of a vehicle with a fixed object or obstacle and tend to sheer the vehicle away from the object and deliver only a glancing blow which does a minimum of damage to the vehicle, and are automatically returned to their normal inward position by the springs 66 and 67 and the corresponding rollers 62 and 63 running on the inclined edges of the tapered flanges 68 and 69.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefor intended to be embraced therein.

What is claimed is:

A vehicle bumper comprising a trussed triangular framework providing a pair of relatively fixed guard members disposed at an angle to the longitudinal center line of the vehicle so as to deliver a glancing blow to an object struck by the bumper, a movable guard member carried by and movable lengthwise of each fixed guard member, antifriction means operatively disposed between each movable guard member and the corresponding fixed guard member, and resilient means operatively connected with each movable guard member to return it from a displaced position to a normal position relative to the associated fixed guard member, said fixed and movable guard members comprising elongated members of channel-shaped cross section with the flange portions of said fixed guard members increasing in width from the inner to the outer ends of such members, said antifriction means comprising rollers carried by the movable guard members and bearing against the outer faces of the corresponding fixed guard members, and said resilient means comprising a plurality of rollers individually connected to the upper and lower flanges of each movable guard member by means permitting such rollers to swing about a pivot point spaced from the roller axis, and springs resiliently forcing said rollers against the edges of the flanges of the fixed guard members to resiliently urge said movable guard members inwardly of the corresponding fixed guard members.

CARL S. BRANDVOLD.

REFERENCES CITED

The following references are of record in the file of this patent:

UNITED STATES PATENTS

| Number | Name | Date |
| --- | --- | --- |
| 718,888 | Taylor | Jan. 20, 1903 |
| 1,659,842 | Tinker | Feb. 21, 1928 |
| 1,901,227 | Cossalter | Mar. 14, 1933 |

FOREIGN PATENTS

| Number | Country | Date |
| --- | --- | --- |
| 128,396 | Germany | Dec. 11, 1900 |
| 887 | France | Dec. 7, 1902 |
| | (Addition to No. 306,762) | |